United States Patent
Byun

(10) Patent No.: US 11,334,248 B2
(45) Date of Patent: May 17, 2022

(54) STORAGE DEVICE AND METHOD OF CHANGING BETWEEN MEMORY BLOCKS OF DIFFERENT BITS BASED ON DELAY OF MIGRATION REQUEST

(71) Applicant: SK hynix Inc., Icheon (KR)

(72) Inventor: Eu Joon Byun, Icheon (KR)

(73) Assignee: SK hynix Inc., Icheon (KR)

(*) Notice: Subject to any disclaimer, the term of this patent is extended or adjusted under 35 U.S.C. 154(b) by 0 days.

(21) Appl. No.: 16/922,317

(22) Filed: Jul. 7, 2020

(65) Prior Publication Data

US 2021/0141532 A1 May 13, 2021

(30) Foreign Application Priority Data

Nov. 7, 2019 (KR) .................. 10-2019-0142051

(51) Int. Cl.
*G06F 3/06* (2006.01)

(52) U.S. Cl.
CPC .......... *G06F 3/0611* (2013.01); *G06F 3/0647* (2013.01); *G06F 3/0673* (2013.01)

(58) Field of Classification Search
CPC .... G06F 3/0647; G06F 3/0611; G06F 3/0673; G06F 3/0655–0656
See application file for complete search history.

(56) References Cited

U.S. PATENT DOCUMENTS

| | | | | |
|---|---|---|---|---|
| 2008/0215800 | A1* | 9/2008 | Lee ........................ | G07C 9/257 711/103 |
| 2015/0254015 | A1* | 9/2015 | Seo ........................ | G06F 3/0658 711/103 |
| 2019/0294368 | A1* | 9/2019 | Hiraishi ................. | G06F 3/0679 |

FOREIGN PATENT DOCUMENTS

| | | | |
|---|---|---|---|
| KR | 20130060791 A | 6/2013 |
| KR | 20130127207 A | 11/2013 |

* cited by examiner

*Primary Examiner* — Chie Yew

(57) ABSTRACT

An electronic device includes a storage device having migration performance of an improved speed. The storage device includes a memory device including a normal memory block and a buffer memory block for temporarily storing data that is to be migrated to the normal memory block and a memory controller configured to control the memory device to migrate the data, which is stored in the buffer memory block, to the normal memory block in response to a migration request received from a host, the memory controller changing a target memory block, in which the data is to be stored, from a first memory block to a second memory block according to whether an operation corresponding to the migration request is delayed or not, while migrating the data to the normal memory block, the first memory block and the second memory block being included in the normal memory block.

17 Claims, 17 Drawing Sheets

STORAGE DEVICE AND METHOD OF CHANGING BETWEEN MEMORY BLOCKS OF DIFFERENT BITS BASED ON DELAY OF MIGRATION REQUEST

CROSS-REFERENCE TO RELATED APPLICATION

The present application claims priority under 35 U.S.C. § 119(a) to Korean Patent Application Number 10-2019-0142051, filed on Nov. 7, 2019, in the Korean Intellectual Property Office, the entire disclosure of which is incorporated herein by reference.

BACKGROUND

1. Technical Field

Embodiments of the present disclosure relate to an electronic device, and more particularly, to a storage device and a method of operating the same.

2. Related Art

A storage device is a device that stores data under the control of a host device such as a computer or a smartphone. The storage device may include a memory device in which data is stored and a memory controller controlling the memory device. The memory device may include a volatile memory device, or a non-volatile memory device, or both.

The volatile memory device is a device that stores data only when power is supplied thereto and loses the stored data when the power supply is cut off. The volatile memory device may include a static random access memory (SRAM), a dynamic random access memory (DRAM), and the like.

The non-volatile memory device is a device that does not lose stored data even though the power supply is cut off. The non-volatile memory device may include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device for performing a migration operation, and a method of operating the same.

A storage device according to an embodiment of the present disclosure includes a memory device including a normal memory block and a buffer memory block for temporarily storing data that is to be migrated to the normal memory block and a memory controller configured to control the memory device to migrate the data, which is stored in the buffer memory block, to the normal memory block in response to a migration request received from a host, the memory controller changing a target memory block, in which the data is to be stored, from a first memory block to a second memory block according to whether an operation corresponding to the migration request is delayed or not, while migrating the data to the normal memory block, the first memory block and the second memory block being included in the normal memory block.

A memory controller according to an embodiment of the present disclosure includes a migration controller configured to control the memory device to migrate data, which is stored in a buffer memory block of the memory device, to a normal memory block of the memory device in response to a migration request received from a host and a write position setting component configured to determine a target memory block, in which the data is to be stored, between a first memory block and a second memory block in the normal memory block according to whether an operation corresponding to the migration request is delayed or not.

A method of operating a storage device according to an embodiment of the present disclosure includes storing data in a buffer memory block of the memory device in response to a turbo write request and migrating the data, which is stored in the buffer memory block of the memory device, to a normal memory block of the memory device in response to a migration request received from a host, wherein the migrating comprises, changing a target memory block, in which the data is to be stored, from a first memory block to a second memory block according to whether an operation corresponding to the migration request is delayed or not, while migrating the data to the normal memory block, the first memory block and the second memory block being included in the normal memory block and migrating the data to the second memory block when the operation corresponding to the migration request is delayed.

The storage device and the method of operating the same according to the present technology provide improved migration performance.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Hereinafter, embodiments of the present disclosure will be described with reference to the accompanying drawings so that those skilled in the art may easily implement the technical spirit of the present disclosure.

Figure 1:
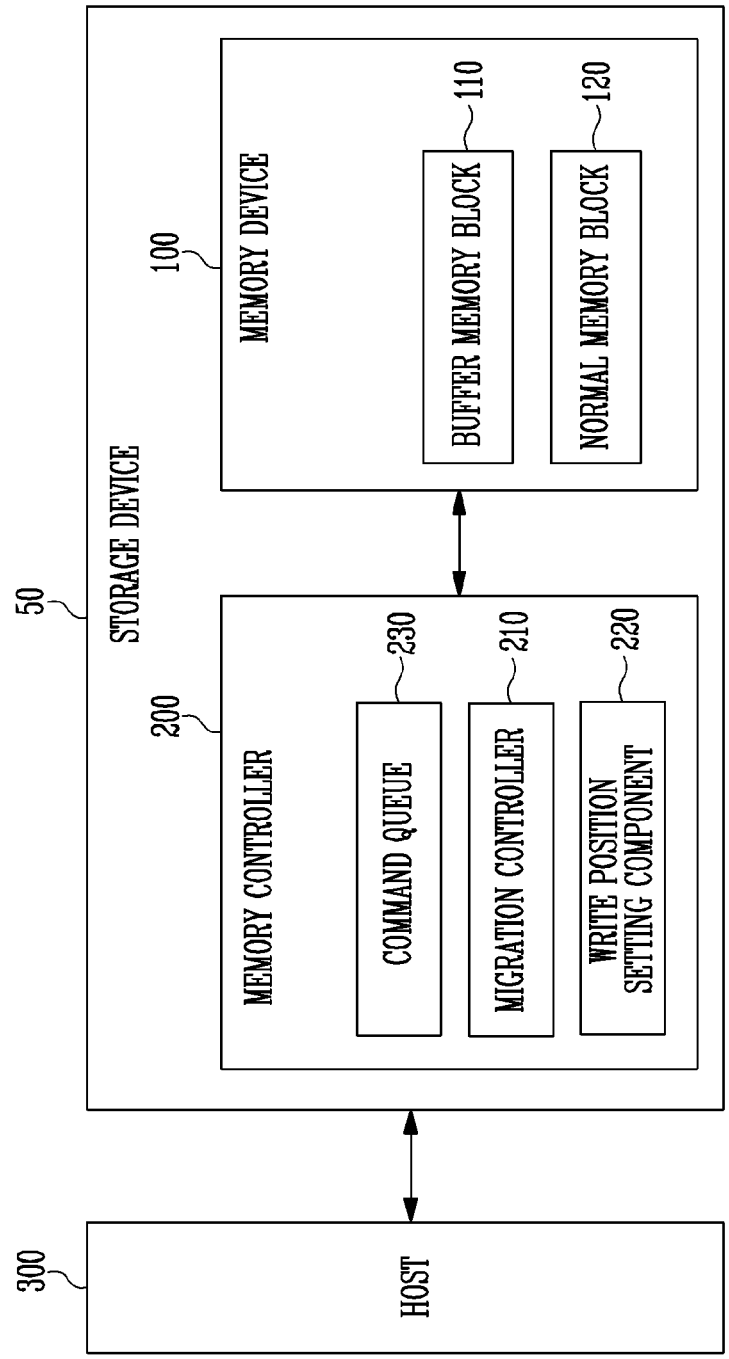
FIG. 1 is a block diagram illustrating a storage device according to an embodiment.

FIG. 1 is a block diagram illustrating a storage device 50 according to an embodiment.

Referring to FIG. 1, the storage device 50 may include a memory device 100 and a memory controller 200 for controlling an operation of the memory device 100.

The storage device 50 may be a device that stores data under the control of a host 300 such as a cellular phone, a smartphone, an MP3 player, a laptop computer, a desktop computer, a game player, a TV, a tablet PC, an in-vehicle infotainment system, or the like.

The storage device 50 may include one of various types of storage devices according to a host interface that is a communication method with the host 300. For example, the storage device 50 may be configured as any one of various types of storage devices such as an SSD, a multimedia card in a form of an MMC, an eMMC, an RS-MMC, or a micro-MMC, a secure digital card in a form of an SD, a mini-SD, or a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so on.

The storage device 50 may be manufactured as any one of various types of packages such as a package on package (POP), a system in package (SIP), a system on chip (SOC), a multi-chip package (MCP), a chip on board (COB), a wafer-level fabricated package (WFP), a wafer-level stack package (WSP), and so on.

The memory device 100 may store data. The memory device 100 operates under the control of the memory controller 200. The memory device 100 may include a plurality of memory dies. Each of the plurality of memory dies may include a memory cell array including a plurality of memory cells that store data.

Each of the memory cells may be configured as a single level cell (SLC) storing one-bit data, a multi-level cell (MLC) storing two-bit data, a triple level cell (TLC) storing three-bit data, or a quad level cell (QLC) storing four-bit data.

The memory cell array may include a plurality of memory blocks. Each memory block may include a plurality of memory cells. One memory block may include a plurality of pages. In an embodiment, a page may be a unit for storing data in the memory device 100 or reading data stored in the memory device 100. A memory block may be a unit for erasing data stored in the memory device 100.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change random access memory (PRAM), a magneto-resistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 may receive a command and an address from the memory controller 200. The memory device 100 is configured to access a memory region in the memory cell array that is selected by the received address. Accessing the selected memory region means performing an operation corresponding to the received command on the selected memory region. For example, the memory device 100 may perform a write operation (or program operation), a read operation, and an erase operation. During the program operation, the memory device 100 may program data to the memory region selected by the address. During the read operation, the memory device 100 may read data stored in the memory region selected by the address. During the erase operation, the memory device 100 may erase data stored in the memory region selected by the address.

The memory device 100 may include a plurality of memory dies. Each memory die may include at least one memory cell array. The plurality of memory dies may be controlled through a die interleaving operation, a channel interleaving operation, a way interleaving operation, or a plane interleaving operation.

In an embodiment of the present disclosure, the memory device 100 may include a buffer memory block 110 and a normal memory block 120. The buffer memory block 110 may be a memory block that temporarily stores data received from the memory controller 200. The data temporarily stored in the buffer memory block 110 may be migrated to the normal memory block 120. Each memory cell included in the buffer memory block 110 may store one-bit data. Each memory cell included in the normal memory block 120 may store one-bit data or multi-bit data.

When power is applied to the storage device 50, the memory controller 200 may execute firmware (FW). The firmware FW may include a host interface layer HIL that receives a request from the host 300 or outputs a response to the host 300, a flash translation layer (FTL) that manages an operation between an interface of the host 300 and an interface of the memory device 100, and a flash interface layer (FIL) that provides a command, corresponding to the request, to the memory device 100 or receive the response from the memory device 100.

The memory controller 200 may receive a request, write data, and a logical address (LA) from the host 300, and may map the logical address to a physical address (PA) indicating an address of memory cells in which the write data is to be stored. The LA may be a logical block address (LBA), and the PA may be a physical block address (PBA).

The memory controller 200 may control the memory device 100 to perform the program operation, the read operation, or the erase operation according to a request of the host 300. During the program operation, the memory controller 200 may provide a program command, a PBA, and write data to the memory device 100. During the read operation, the memory controller 200 may provide a read command and a PBA to the memory device 100. During the erase operation, the memory controller 200 may provide an erase command and a PBA to the memory device 100.

The memory controller 200 may control the memory device 100 to perform the program operation, the read operation, or the erase operation by itself regardless of a request from the host 300. For example, the memory controller 200 may control the memory device 100 to perform the program operation, the read operation, or the erase operation in order to perform a background operation such as wear leveling, garbage collection, or read reclaim.

In an embodiment of the present disclosure, the memory controller 200 may include a migration controller 210, a write position setting component 220, and a command queue 230.

In an embodiment, the migration controller 210, the write position setting component 220, and the command queue 230 may be implemented using one or more processors (not shown) and a memory or register (not shown) included in the memory controller 200.

The migration controller 210 may receive a migration request from the host 300 and control the memory device 100 to migrate data temporarily stored in the buffer memory block 110 to the normal memory block 120.

The write position setting component 220 may determine a memory block to which the data temporarily stored in the buffer memory block 110 is migrated among a plurality of memory blocks (not shown) included in the normal memory block 120. The write position setting component 220 may determine the memory block to which the data temporarily stored in the buffer memory block 110 is migrated, based on whether there is a delay in an operation associated with the migration request from the host 300, and may generate storage position information indicating the determined memory block. The migration controller 210 may control the memory device 100 to migrate the data temporarily stored in the buffer memory block 110 to the normal memory block 120, based on the storage position information received from the write position setting component 220.

The command queue 230 may store commands corresponding to a request received from the host 300 in a memory or register (not shown) included in the memory controller 200. For example, when the migration request is received from the host 300, the command queue 230 may store a command group of a read command and a program command, the command group corresponding to the migration request. The migration controller 210 may perform a migration operation by reading the data temporarily stored in the buffer memory block 110 with reference to the read command stored in the command queue 230 and programming the read data in the normal memory block 120 with reference to the program command stored in the command queue 230.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a non-volatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
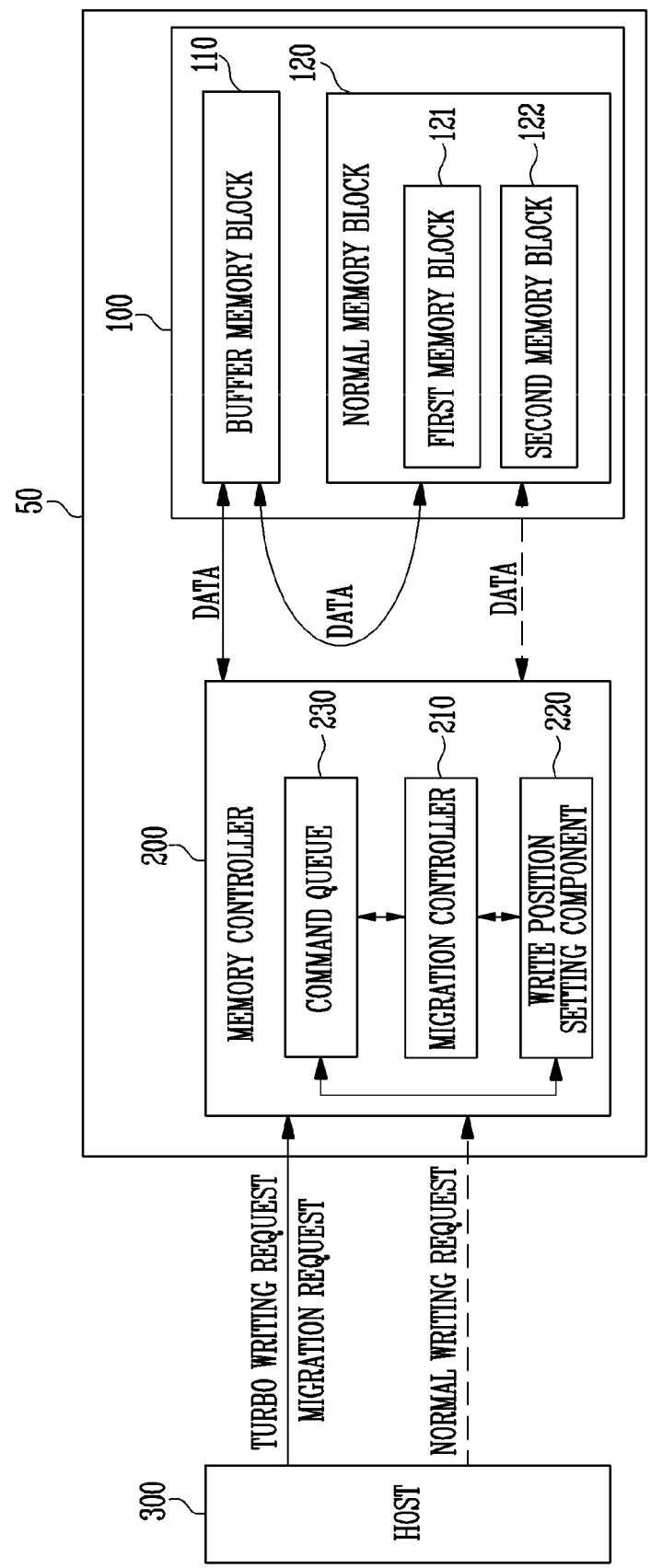
FIG. 2 is a diagram for describing a turbo write operation and a normal write operation according to an embodiment.

FIG. 2 is a diagram for describing a turbo write operation and a normal write operation performed in the storage device 50 of FIG. 1 according to an embodiment.

Referring to FIG. 2, the host 300 may transfer a turbo write request or a normal write request to the memory controller 200 in the storage device 50. When the memory controller 200 receives the normal write request, the memory controller 200 may control the memory device 100 to store data corresponding to the normal write request in the normal memory block 120. When the memory controller 200 receives the turbo write request, the memory controller 200 may control the memory device 100 to temporarily store data corresponding to the turbo write request in the buffer memory block 110.

The host 300 may transfer a migration request to the memory controller 200. When the memory controller 200 receives the migration request, the memory controller 200 may control the memory device 100 to migrate the data temporarily stored in the buffer memory block 110 to the normal memory block 120.

The normal memory block 120 may include a first memory block 121 and a second memory block 122. A memory cell included in the first memory block 121 may store data of a greater number of bits than data stored in a memory cell included in the second memory block 122. For example, when the memory cell included in the first memory block 121 is a memory cell storing multi-bit data such as an MLC, a TLC, a QLC, or the like, the memory cell included in the second memory block 122 may be an SLC storing one-bit data.

Since the memory cell included in the second memory block 122 stores data of a less number of bits than data stored in the memory cell included in the first memory block 121, a distribution interval between threshold voltage distributions thereof may be wider than the distribution interval between program distributions of the memory cell included in the first memory block 121. Therefore, when storing data in the memory cell included in the second memory block 122, reliable data may be stored quickly compared to when storing the data in the memory cell included in the first memory block 121.

Figure 3:
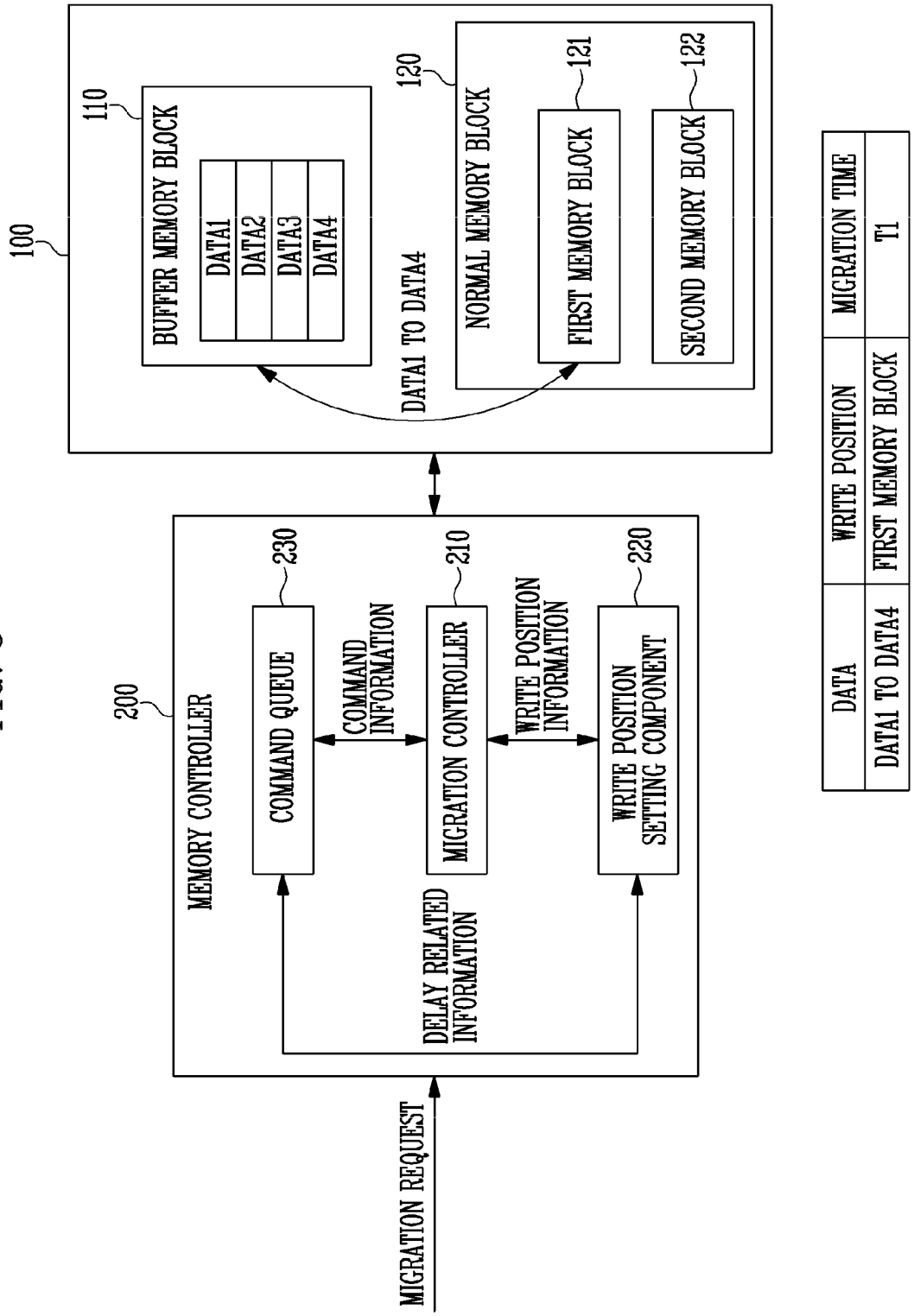
FIG. 3 is a diagram for describing an operation of migrating data to a first memory block according to an embodiment.

FIG. 3 is a diagram for describing an operation of migrating data to the first memory block 121 according to an embodiment.

Referring to FIG. 3, the buffer memory block 110 may temporarily store first data DATA1 to fourth data DATA4. That is, in response to the turbo write request received from the host 300, the memory controller 200 may control the memory device 100 to store the first data DATA1 to the fourth data DATA4 in the buffer memory block 110.

After that, when the migration request is received from the host 300, the migration controller 210 may perform a migration operation of controlling the memory device 100 to migrate the first data DATA1 to the fourth data DATA4, which are stored in the buffer memory block 110, to the normal memory block 120.

The migration controller 210 may perform the migration operation according to migration commands stored in the command queue 230 in correspondence with the migration request. Specifically, the migration controller 210 may perform the migration operation of controlling the memory device 100 to read the data temporarily stored in the buffer memory block 110 and program the read data into the normal memory block 120, by using command information corresponding the migration commands stored in the command queue 230.

The write position setting component 220 may determine one of the first memory block 121 and the second memory block 122 to be a target memory block for storing the first data DATA1 to the fourth data DATA4 based on delay related information stored in the command queue 230, and may generate write position information corresponding to the target memory block. The delay related information may be priority information of commands or time-out information of the commands that are stored in the command queue 230. The priority information of commands relates to processing priority of each command, and the time-out information relates to a process time of each command. The write position information may include physical address information of the target memory block that is the first memory block 121 or the second memory block 122.

The migration controller 210 may receive the write position information from the write position setting component 220, and may control the memory device 100 to store the first data DATA1 to the fourth data DATA4 in the target memory block that is the first memory block 121 or the second memory block 122, based on the write position information.

When the first data DATA1 to the fourth data DATA4 are stored in the first memory block 121, a migration time may be a first time T1. The migration time may include a time taken for reading the first data DATA1 to the fourth data DATA4 from the buffer memory block 110 and a time taken for programming the read first data DATA1 to fourth data DATA4 into the first memory block 121.

Figure 4:
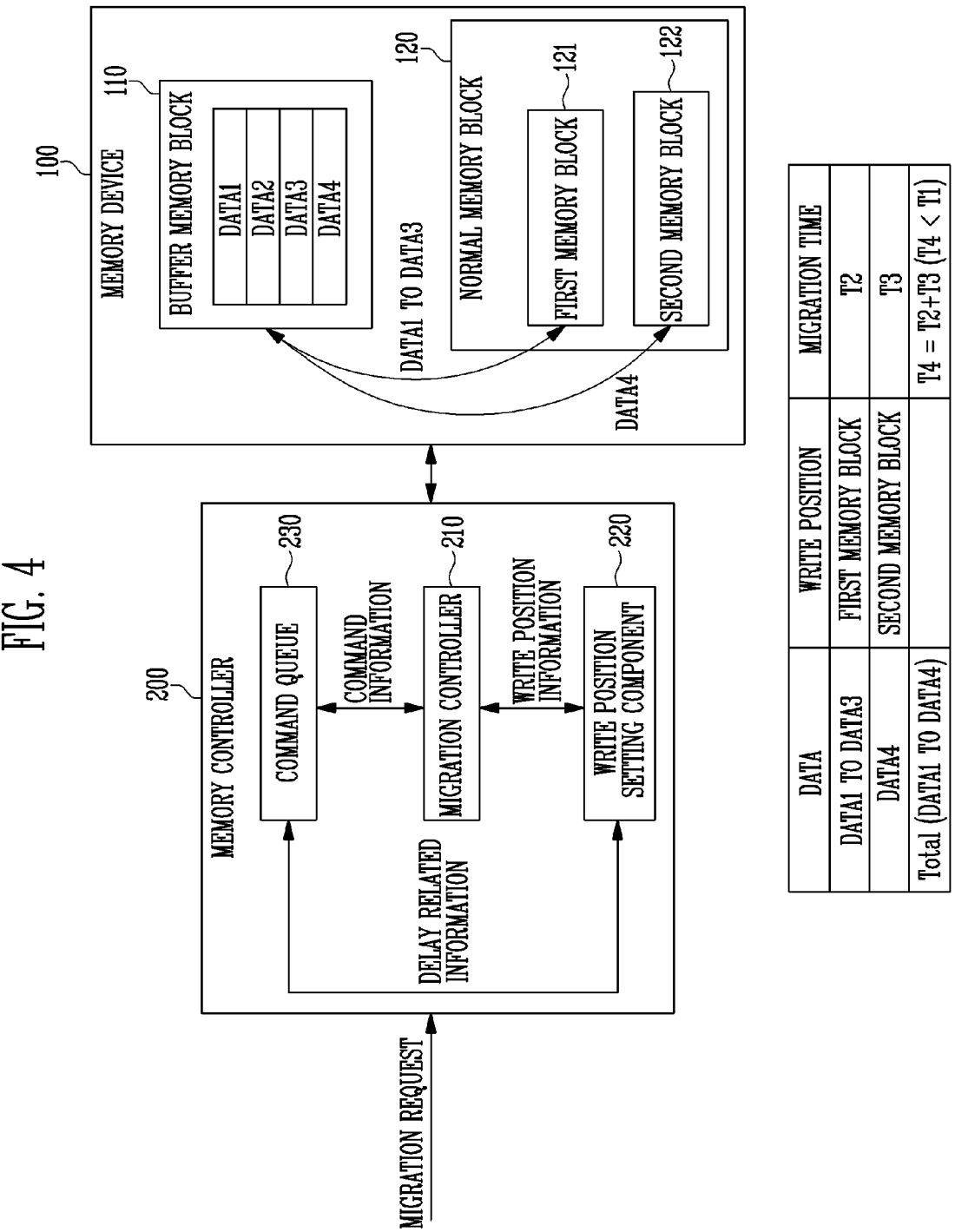
FIG. 4 is a diagram for describing an operation of migrating data to the first memory block and a second memory block according to an embodiment.

FIG. 4 is a diagram for describing an operation of migrating data to the first memory block 121 and the second memory block 122 according to an embodiment.

Referring to FIG. 4, when the migration controller 210 receives the migration request from the host 300, the migration controller 210 may perform the migration operation of controlling the memory device 100 to migrate the first data DATA1 to the fourth data DATA4, which are stored in the buffer memory block 110, to the normal memory block 120.

The write position setting component 220 may determine whether performance of an operation corresponding to the migration command is delayed based on the delay related information stored in the command queue 230. The write position setting component 220 may determine one of the first memory block 121 or the second memory block 122 to be a target memory block to which the first data DATA1 to the fourth data DATA4 are to be migrated, according to whether the performance of the operation corresponding to the command is delayed. The delay related information may be priority information of commands or time-out information of the commands.

For example, the write position setting component 220 may determine that the performance of the operation corresponding to the migration command is delayed after the first data DATA1 to the third data DATA3 are stored in the first memory block 121. When the write position setting component 220 determines that the performance of the operation corresponding to the migration command is delayed, the write position setting component 220 may generate write position information to store the fourth data DATA4 in the second memory block 122.

When data is stored in a memory cell included in the second memory block 122, reliable data may be stored quickly compared to when the data is stored in a memory cell included in the first memory block 121. Therefore, a time T4 that is a sum of a time T2 taken when migrating the first data DATA1 to the third data DATA3 to the first memory block 121 and a time T3 taken when migrating the fourth data DATA4 to the second memory block 122 may be less than the migration time T1 taken when migrating all of the first data DATA1 to the fourth data DATA4 to the first memory block 121 (T4<T1).

When the first data DATA1 to the fourth data DATA4 are stored in the first memory block 121 or the second memory block 122, the migration controller 210 may notify the host 300 of migration completion by sending migration completion information to the host 300.

After notifying the host 300 of the migration completion, the memory controller 200 may control the memory device 100 to move the fourth data DATA4 stored in the second memory block 122 to the first memory block 121 at an idle time.

In an embodiment of the present disclosure, a response time taken for notifying the host 300 of the migration completion may be reduced by migrating the data temporarily stored in the buffer memory block 110 to different memory blocks in the normal memory block 120.

That is, in accordance with the embodiment, the storage device 50 may shorten the migration time by migrating the data stored in the buffer memory block 110 to the normal memory block, e.g., the second memory block 122, including a memory cell capable of storing data of a less number of bits compared to a memory cell in the first memory block 121, according to whether the performance of the operation corresponding to the migration command is delayed.

Figure 5:
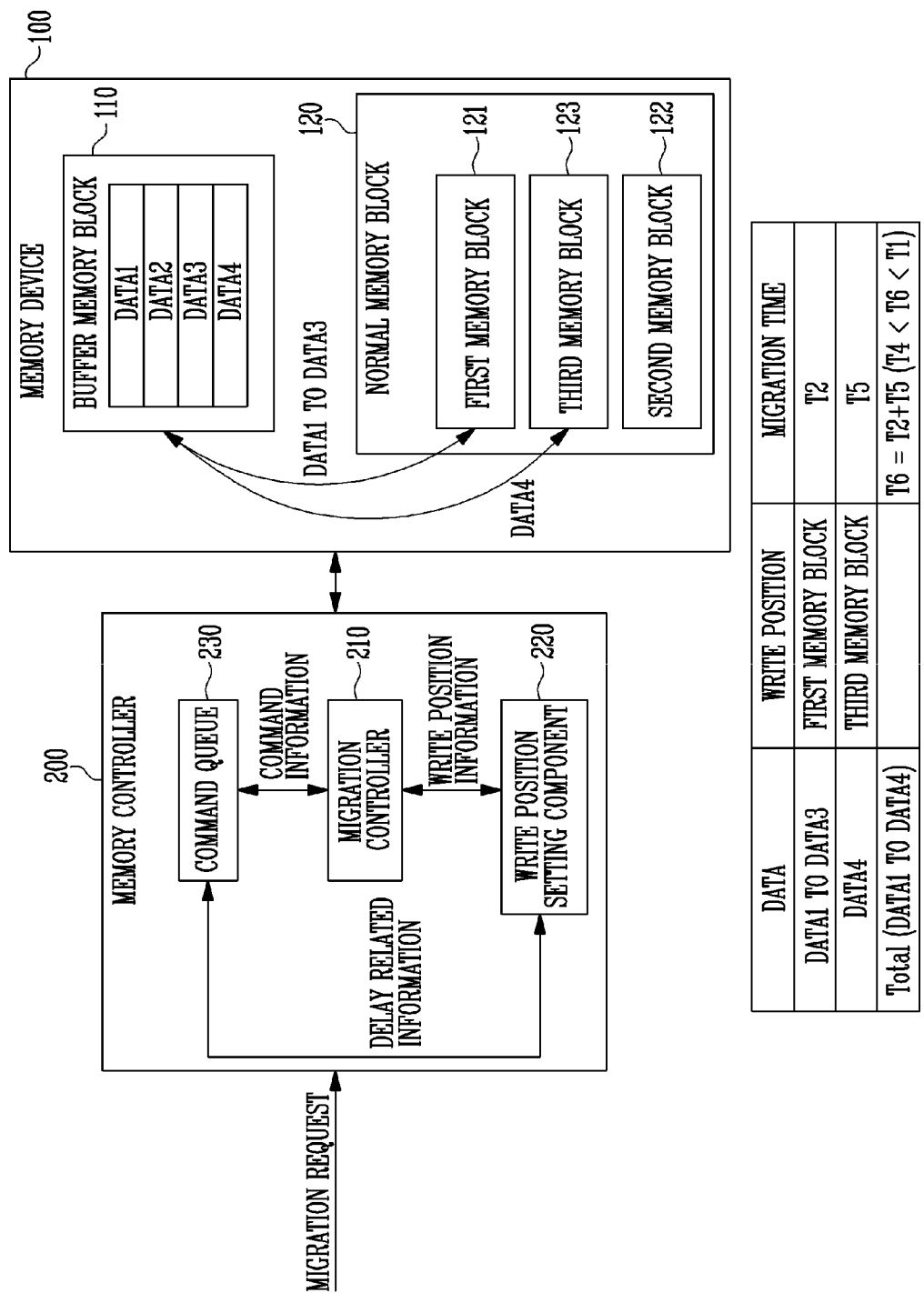
FIG. 5 is a diagram for describing an operation of migrating data to the first memory block and a third memory block according to an embodiment.

FIG. 5 is a diagram for describing an operation of migrating data to the first memory block 121 and a third memory block 123 according to an embodiment.

Referring to FIG. 5, the normal memory block 120 may further include the third memory block 123. A memory cell included in the third memory block 123 may store data of a less number of bits than data stored in the memory cell included in the first memory block 121, and may store data of a greater number of bits than data stored in the memory cell included in the second memory block 122. For example, when the memory cell included in the second memory block 122 is an SLC, the memory cell included in the third memory block 123 may an MLC, and the memory cell included in the first memory block 121 may be a TLC.

Since the memory cell included in the third memory block 123 stores the data of the less number of bits than the data stored in the memory cell included in the first memory block 121, a distribution interval between threshold voltage distributions thereof may be wider than the distribution interval between threshold voltage distributions of the memory cell included in the first memory block 121. Therefore, when storing the data in the memory cell included in the third memory block 123, reliable data may be stored quickly compared to when storing the data in the memory cell included in the first memory block 121.

Meanwhile, since the memory cell included in the third memory block 123 stores the data of the greater number of bits than the data stored in the memory cell included in the second memory block 122, the distribution interval between threshold voltage distributions thereof may be narrower that the distribution interval between threshold voltage distributions of the memory cell included in the second memory block 122. Therefore, when storing the data in the memory cell included in the second memory block 122, reliable data may be stored quickly compared to when storing the data in the memory cell included in the third memory block 123.

The write position setting component 220 may determine whether the operation corresponding to the migration command is delayed or not after the first data DATA1 to the third data DATA3 are stored in the first memory block 121. When it is determined that the operation corresponding to the migration command is delayed, the write position setting component 220 may generate write position information to store the fourth data DATA4 in the third memory block 123.

Since a time T5 taken for migrating the fourth data DATA4 to the third memory block 123 may be longer than the time T3 taken for migrating the fourth data DATA4 to the second memory block 122, a total migration time T6 shown in FIG. 5 may be shorter than the total migration time T1 shown in FIG. 3, and may be longer than the total migration time T4 shown in FIG. 4.

Referring to FIGS. 4 and 5, the storage device 50 may selectively migrate data, which is not migrated to the first memory block 121 among the data stored in the buffer memory block 110, to the second memory block 122 or the third memory block 123. That is, the storage device 50 may selectively migrate data to different memory blocks in consideration of a migration time and efficient utilization of a logical storage space of the memory device 100.

Figure 6:
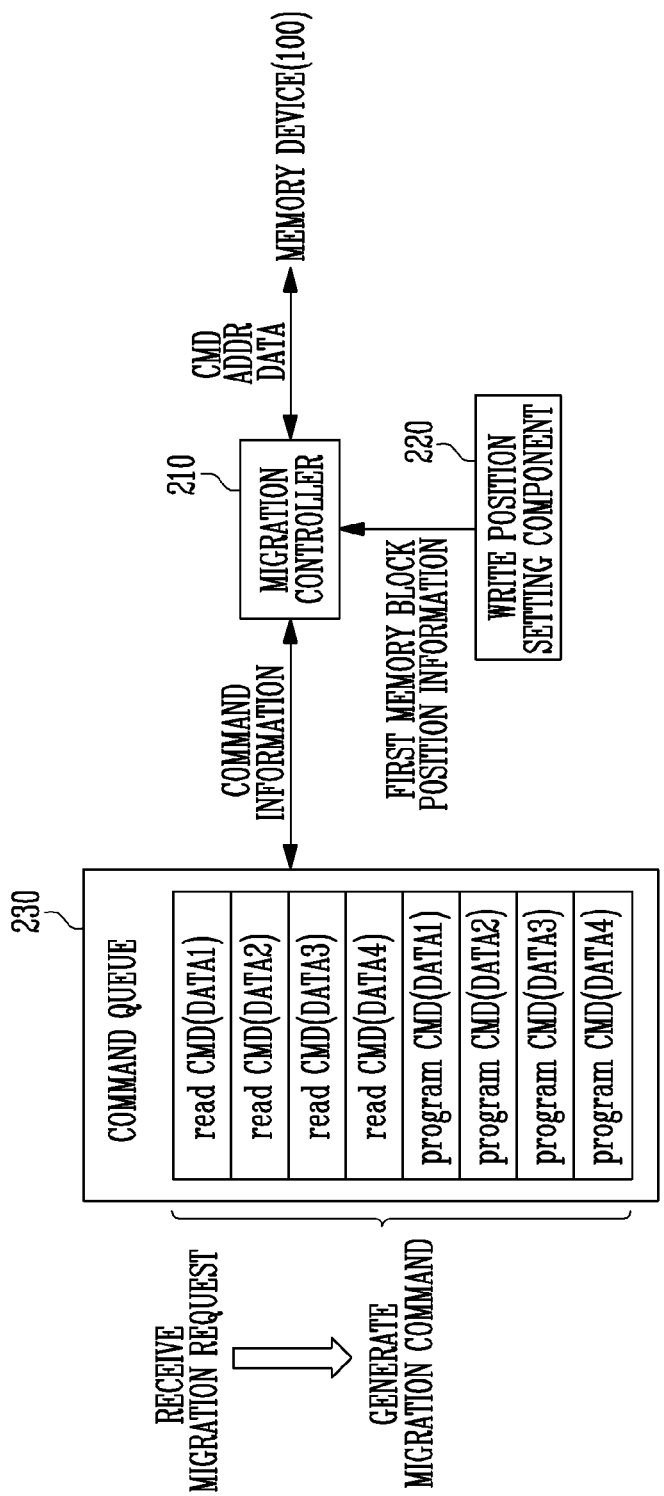
FIG. 6 is a diagram for describing a structure of a command queue and a migration operation according to an embodiment.

FIG. 6 is a diagram for describing a structure of the command queue 230 and a migration operation according to an embodiment.

Referring to FIG. 6, when the migration request is received from the host 300, migration commands may be generated in the command queue 230. The migration commands may be commands for migrating the data temporarily stored in the buffer memory block 110 to the normal memory block 120 in the memory device 100. The migration commands may include a read command for the first data DATA1, a read command for the second data DATA2, a read command for the third data DATA3, a read command for the fourth data DATA4, a program command for the first data DATA1, a program command for the second data DATA2, a program command for the third data DATA3, and a program command for the fourth data DATA4. The migration commands may be sequentially processed. For convenience of description, the program commands are processed after all read commands are processed, but a processing sequence of the read commands and the program commands is not limited thereto.

When the migration commands are generated, the migration controller 210 may receive command information corresponding to the migration commands from the command queue 230, and transfer a command CMD, an address ADDR, and/or data DATA to the memory device 100. When the migration controller 210 transfers a program command to the memory device 100, the migration controller 210 may receive write position information of a memory block into which data is to be programmed from the write position setting component 220, and may transfer an address generated based on the write position information to the memory device 100.

In the embodiment shown in FIG. 6, the write position setting component 220 may transfer write position information of the first memory block 121 to the migration controller 210. The migration controller 210 may control the memory device 100 to read data from the buffer memory block 110 in response to a read command stored in the command queue 230 and to program the read data into the first memory block 121 in response to a program command stored in the command queue 230.

Figure 7:
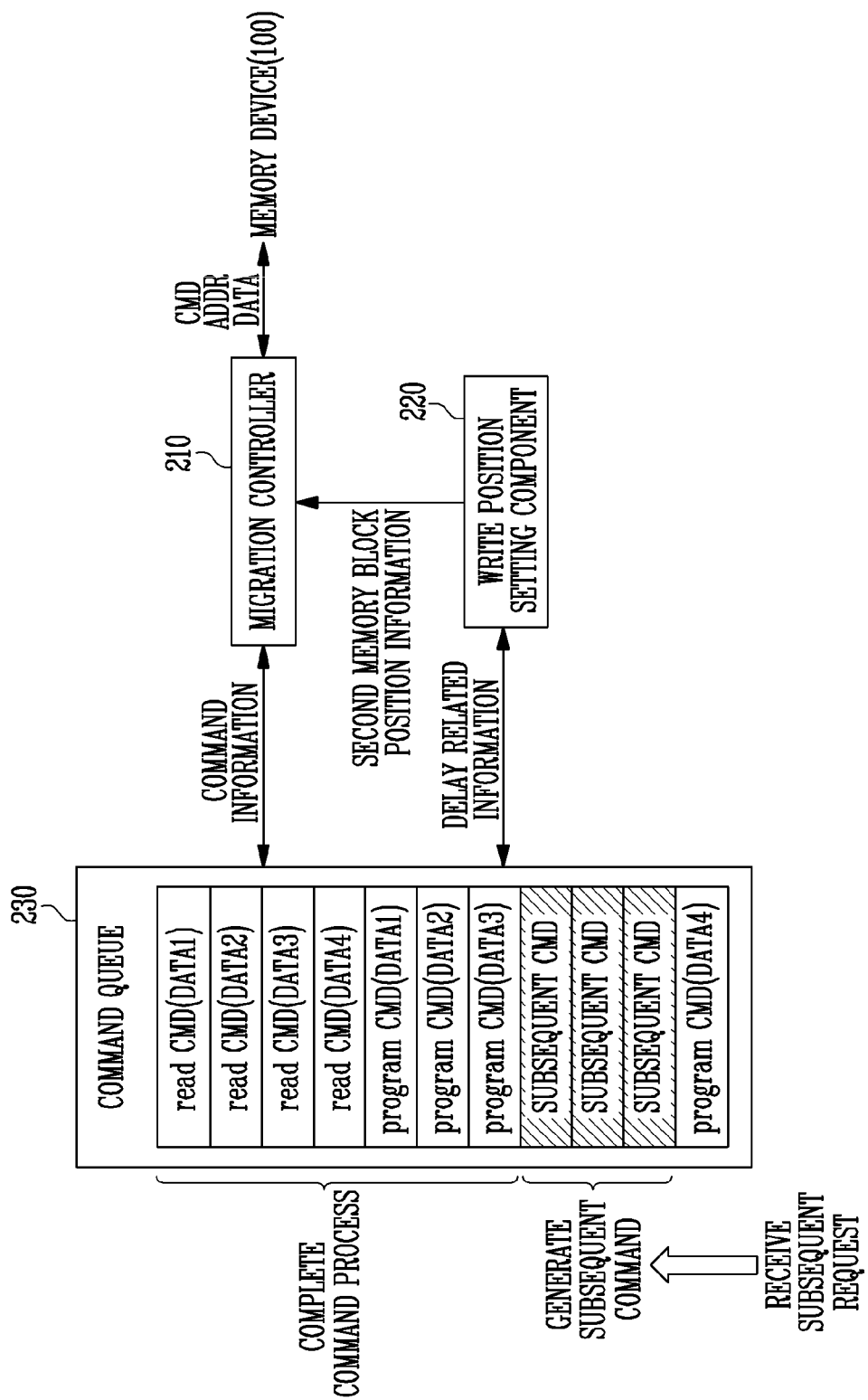
FIG. 7 is a diagram for describing a migration operation according to an embodiment.

FIG. 7 is a diagram for describing a migration operation according to an embodiment.

Referring to FIG. 7, after a program command for the third data DATA3 is completed, subsequent commands may be generated in the command queue 230 according to a request of the host 300 or an internal operation of the storage device 50. Processing priority of the subsequent commands may be higher than processing priority of a program command for the fourth data DATA4. Therefore, an operation corresponding to the program command for the fourth data DATA4 may be delayed.

The write position setting component 220 may obtain delay related information from the command queue 230. The delay related information may include priority information of the commands or time-out information of the commands. The write position information may include physical address information of the first memory block 121 or the second memory block 122.

The write position setting component 220 may generate write position information such that the fourth data DATA4 is programmed into the second memory block 122 based on the delay related information. For example, the write position setting component 220 may determine the number of commands having processing priority higher than that of the program command for the fourth data DATA4 based on the priority information of the commands, and when the number of commands having the higher processing priority than that of the program command for the fourth data DATA4 is greater than a first threshold number, the write position setting component 220 may generate the write position information such that the fourth data DATA4 is programmed into the second memory block 122. Alternatively, the write position setting component 220 may determine a waiting time (or delay time) of the operation corresponding to the program command for the fourth data DATA4 based on the time-out information relating to a process time of each command, and when the waiting time is greater than a first threshold time, the write position setting component 220 may generate the write position information such that the fourth data DATA4 is programmed into the second memory block 122. The waiting time or delay time of the operation corresponding to the program command for the fourth data DATA4 represents a period of time from when the program command is generated to when the processing of the operation starts.

Figure 8:
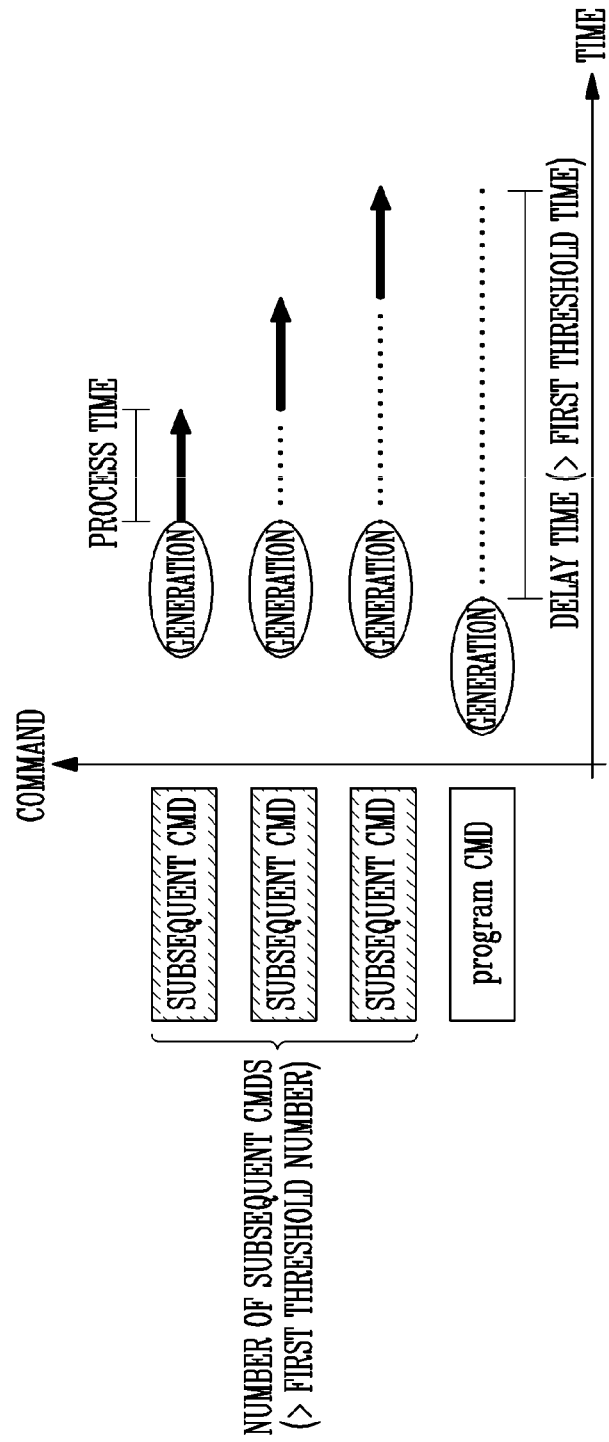
FIG. 8 is a diagram for describing the migration operation illustrated in FIG. 7.

FIG. 8 is a diagram for describing the migration operation illustrated in FIG. 7.

Referring to FIG. 8, a program command that is a migration command may be generated before subsequent commands are generated, but the subsequent commands may be processed prior to the program command according to processing priority. In this case, the write position setting component 220 may determine that an operation corresponding to the program command is delayed, and may migrate data stored in the buffer memory block 110 to a memory block including a memory cell that stores data of relatively less bits in order to quickly process the program command.

Specifically, when the number of subsequent commands having processing priority higher than that of the program command is greater than the first threshold number, or when a delay time of the program command exceeds the first threshold time, the write position setting component 220 may change a write position such that a normal memory block to which data stored in the buffer memory block 110 is migrated becomes a memory block including a memory cell that stores data of relatively less bits.

Figure 9:
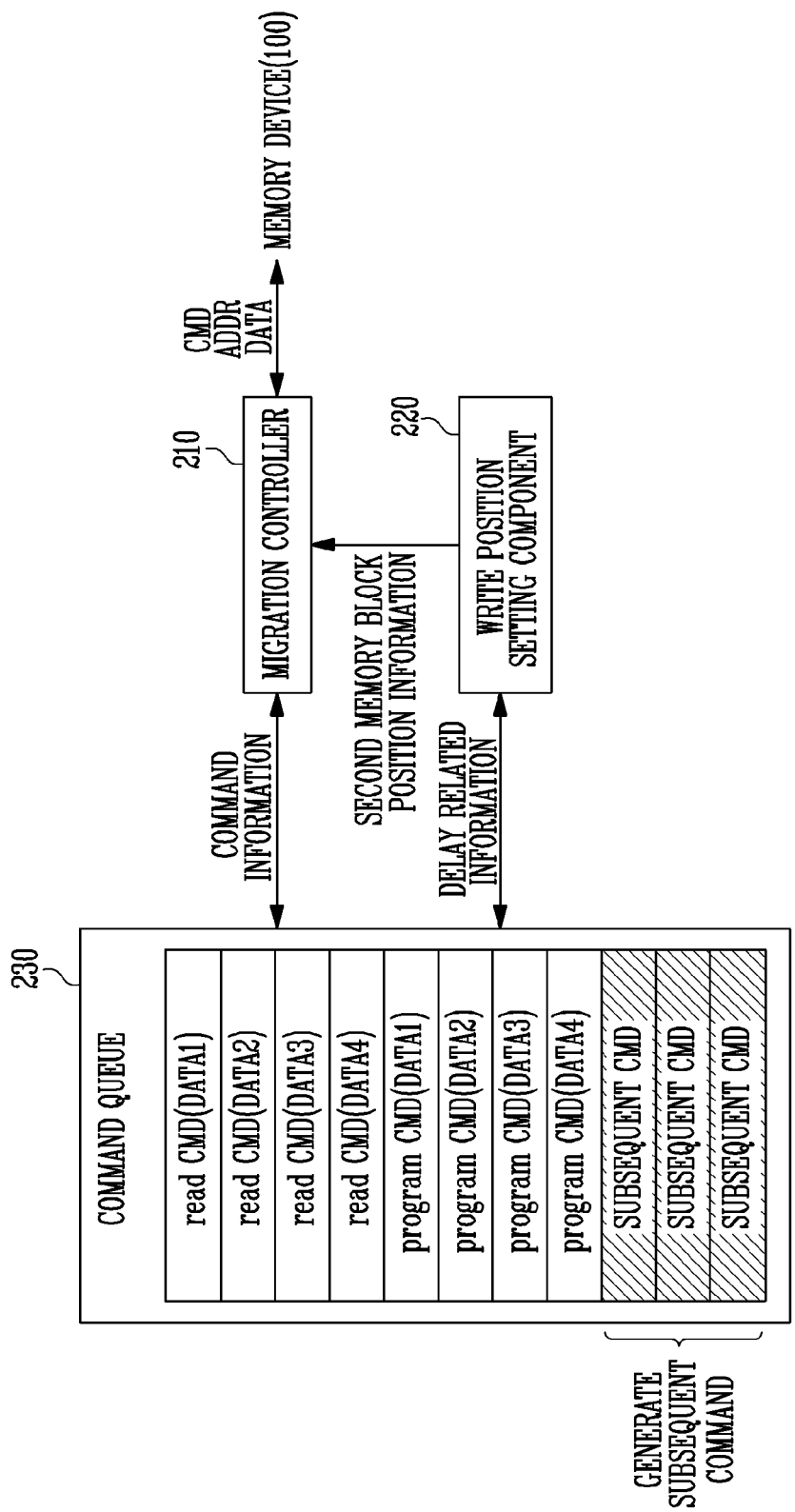
FIG. 9 is a diagram for describing a migration operation according to another embodiment.

FIG. 9 is a diagram for describing a data migration operation according to another embodiment.

Referring to FIG. 9, before all migration commands are processed, a plurality of subsequent commands having processing priority lower than that of the migration commands may be generated in the command queue 230 in response to a subsequent request. When the plurality of subsequent commands are simultaneously generated, a long delay time may occur until an operation corresponding to a subsequent command having a relatively low processing priority is performed.

The write position setting component 220 may obtain the delay related information from the command queue 230. The delay related information may include priority information of the commands or time-out information of the commands. The write position information may include the physical address information of the first memory block 121 or the second memory block 122.

The write position setting component 220 may generate write position information such that the fourth data DATA4 is programmed into the second memory block 122 based on the delay related information. For example, the write position setting component 220 may determine the number of subsequent commands having higher processing priority than a subsequent command having lowest processing priority among the plurality of subsequent commands based on the priority information, and when the number of subsequent commands having the higher processing priority is greater than a second threshold number, the write position setting component 220 may generate the write position information such that the fourth data DATA4 is programmed into the second memory block 122. Alternatively, the write position setting component 220 may determine a waiting time of an operation corresponding to the subsequent command having the lowest processing priority based on the time-out information, and when the waiting time is greater than a second threshold time, the write position setting component 220 may generate the write position information such that the fourth data DATA4 is programmed into the second memory block 122.

The waiting time of the operation corresponding to the subsequent command having the lowest processing priority may be shortened by quickly performing the migration command having higher processing priority than the plurality of subsequent commands.

Figure 10:
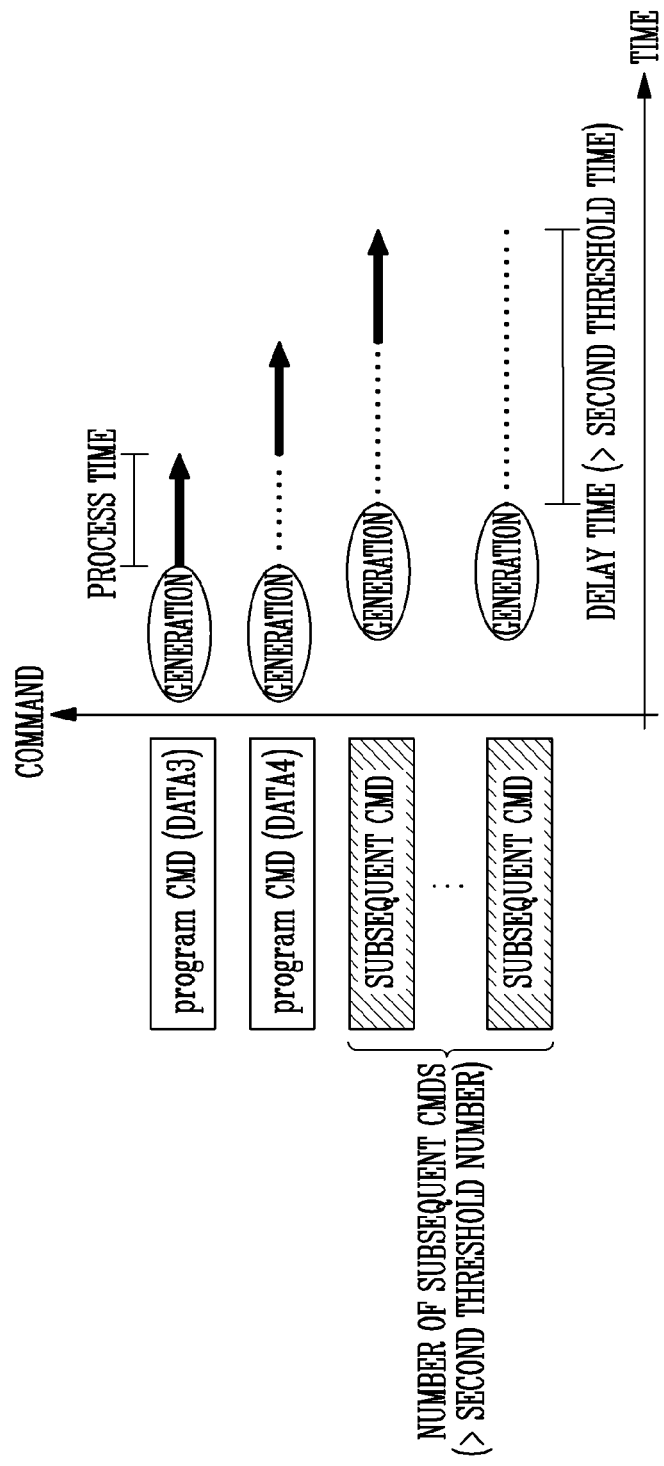
FIG. 10 is a diagram for describing the migration operation illustrated in FIG. 9.

FIG. 10 is a diagram for describing the data migration operation illustrated in FIG. 9.

Referring to FIG. 10, the plurality of subsequent commands may be generated in the command queue 230 while migration commands are processed. The plurality of subsequent commands may have processing priority lower than that of the migration commands. Therefore, the processing of the plurality of subsequent commands may be delayed until the migration commands are processed. Even though the plurality of subsequent commands are simultaneously generated, the processing of a subsequent command having relatively low processing priority may be delayed longer than the processing of a subsequent command having relatively high processing priority. In this case, in order to secure a process time of the plurality of subsequent commands, during a program operation for migration, the write position setting component 220 may migrate the data stored in the buffer memory block 110 to a memory block including a memory cell that stores data of relatively less bits.

Specifically, when the number of subsequent commands having higher processing priority than the subsequent command having the lowest processing priority among the plurality of subsequent commands is greater than the second threshold number, the write position setting component 220 may change the write position information such that the data stored in the buffer memory block 110 is migrated to a memory block including a memory cell that stores data of relatively less bits. Alternatively, when the waiting time of the operation corresponding to the subsequent command having the lowest processing priority is greater than the second threshold time, the write position setting component 220 may change the write position information such that the fourth data DATA4 is programmed into the second memory block 122.

Figure 11:
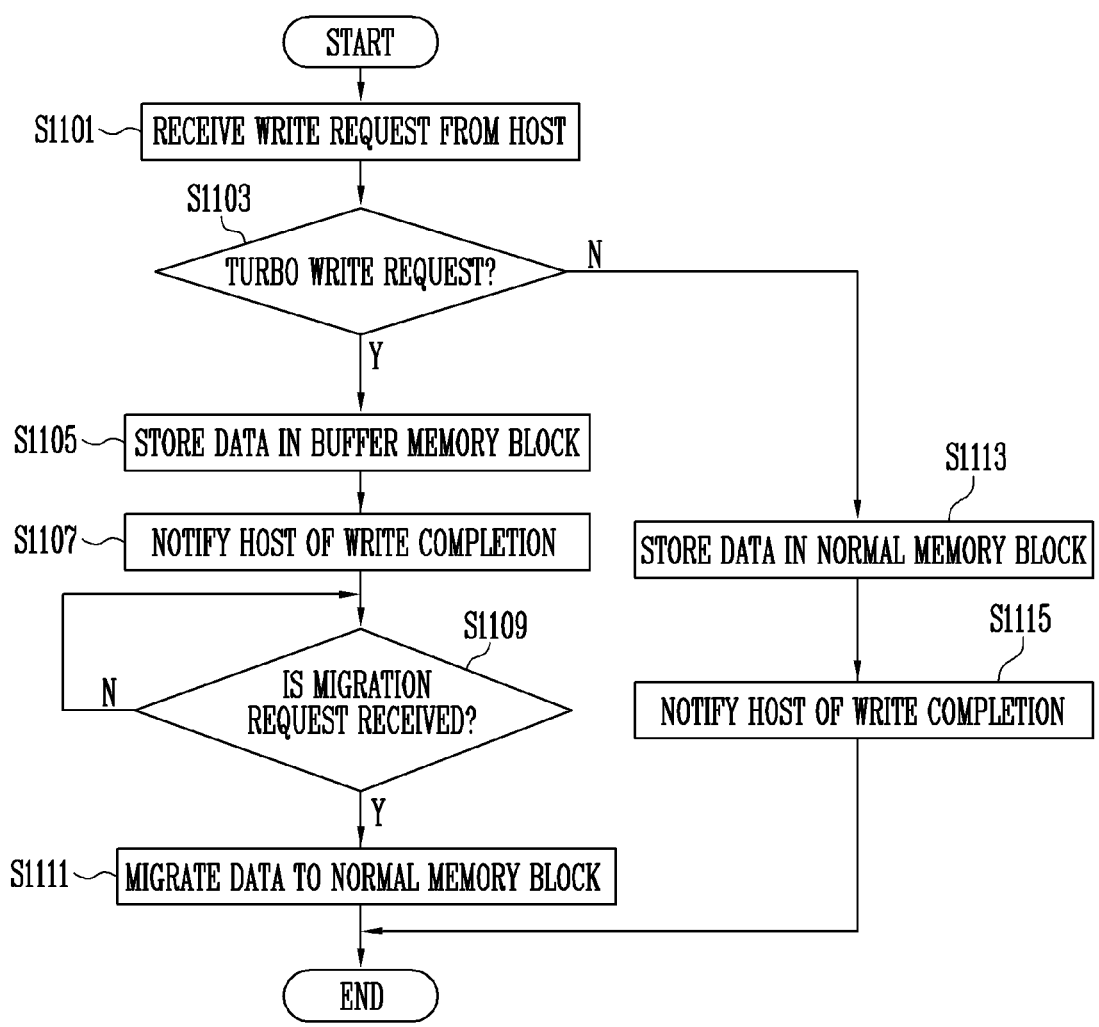
FIG. 11 is a flowchart for describing a method of operating a storage device according to an embodiment.

FIG. 11 is a flowchart for describing a method of operating the storage device 50 of FIG. 1 according to an embodiment.

Referring to FIG. 11, in step S1101, the storage device 50 may receive a write request from the host 300. The storage device 50 may receive address information or data information together with the write request from the host 300.

In step S1103, it is determined whether the write request received from the host 300 is a turbo write request or not. When it is determined that the write request received from the host 300 is not the turbo write request, the process moves to step S1113.

In step S1113, the storage device 50 may store data received from the host 300 in the normal memory block 120. The storage device 50 may select a memory block in which the data received from the host 300 is to be stored in consideration of the number of bits of data stored in a memory cell included in each of the first memory block 121, the second memory block 122, and the third memory block 123 included in the normal memory block 120, or the speed at which the data is stored in the memory cell.

In step S1115, the storage device 50 may notify the host 300 of writing completion after storing the data in the normal memory block 120 in step S1113.

In step S1103, when it is determined that the write request received from the host 300 is the turbo write request, the process moves to step S1105.

In step S1105, the storage device 50 may store the data received from the host 300 in the buffer memory block 110. A memory cell included in the buffer memory block 110 may store one-bit data. A distribution interval between threshold voltage distributions indicated by data stored in the buffer memory block 110 may be relatively wide. Therefore, the speed at which the data is stored in the buffer memory block 110 may be faster than the speed at which the data is stored in the normal memory block 120.

In step S1107, the storage device 50 may notify the host 300 of writing completion after storing the data in the buffer memory block 110. In this case, the storage device 50 may notify the writing completion more quickly than the case when storing the data in the normal memory block 120.

In step S1109, when it is determined that the storage device 50 receives a migration request from the host 300, the process may move to step S1111 so that the data stored in the buffer memory block 110 is migrated to the normal memory block 120. On the other hand, when it is determined that the storage device 50 does not receive the migration request from the host 300, the storage device 50 may wait until the migration request is received. Alternatively, a situation in which a migration operation is triggered inside the storage device 50 may occur. For example, when a size of data stored in the buffer memory block 110 is equal to or greater than a reference value, the data stored in the buffer memory block 110 may be migrated to the normal memory block 120.

Figure 12:
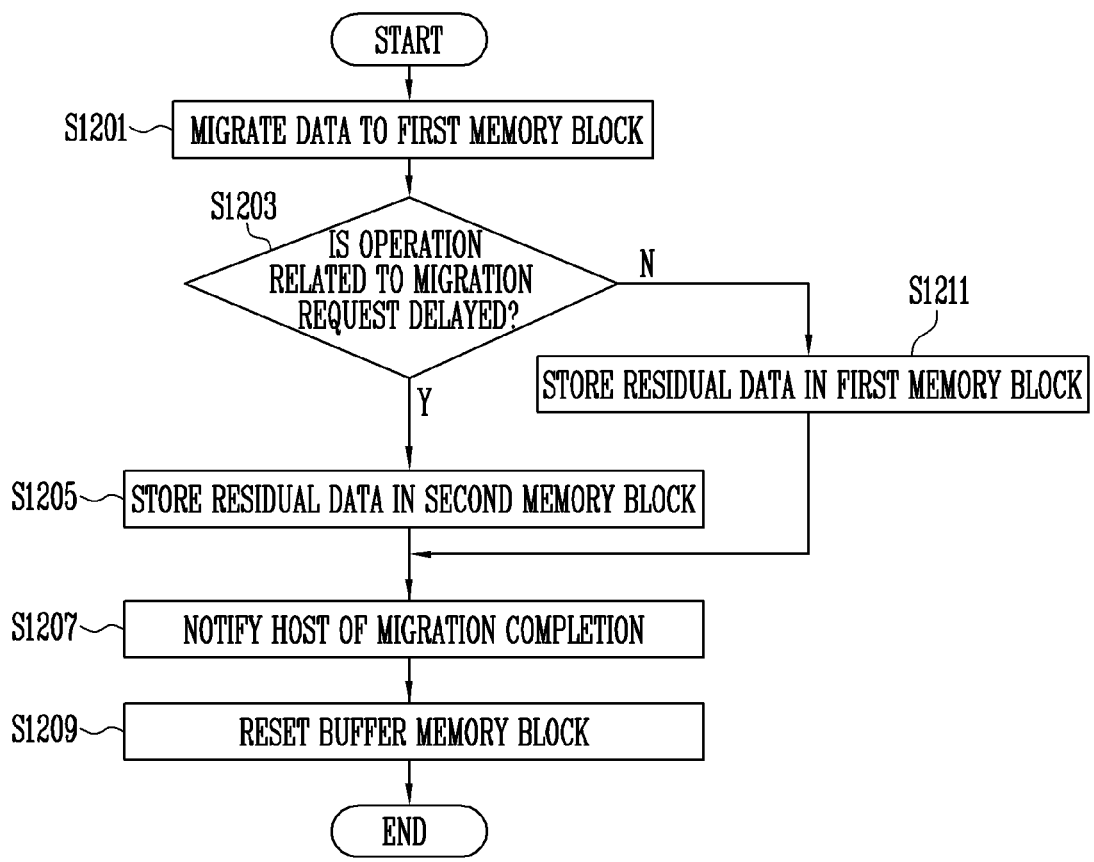
FIG. 12 is a diagram for describing a process of migrating data to a normal memory block according to an embodiment.

FIG. 12 is a diagram for describing a process of migrating data to a normal memory block. The process of FIG. 12 will be described with reference to the storage device 50 shown in FIG. 1.

Referring to FIG. 12, in step S1201, the storage device 50 may migrate the data stored in the buffer memory block 110 to the first memory block 121 in the normal memory block 120. A memory cell included in the first memory block 121 may store multi-bit data, e.g., data of two or more bits.

In step S1203, the storage device 50 may determine whether an operation associated with a migration request is delayed.

In an embodiment, the storage device 50 may determine whether the operation corresponding to the migration request is delayed. For example, in response to the migration request, the number of subsequent commands having processing priority higher than that of a migration command generated in the command queue 230 may be determined. When the number of subsequent commands having higher processing priority is greater than the first threshold number, it may be determined that the operation corresponding to the migration request is delayed. Alternatively, the waiting time of the operation corresponding to the migration command generated in the command queue 230 may be determined, and when the waiting time is greater than the first threshold time, it may be determined that the operation corresponding to the migration request is delayed. This embodiment also has been described with reference to FIGS. 7 and 8.

In another embodiment, the storage device 50 may determine whether an operation corresponding to a subsequent request received after the migration request is delayed. For example, when a plurality of subsequent commands are generated in the command queue 230 in response to the subsequent request, the number of subsequent commands having higher processing priority than a subsequent command having the lowest processing priority among the plurality of subsequent commands may be determined. When the number of subsequent commands having the higher processing priority is greater than the second threshold number, it may be determined that the operation corresponding to the migration request is delayed. Alternatively, the waiting time of the operation corresponding to the subsequent command having the lowest processing priority may be determined, and when the waiting time is greater than the second threshold time, it may be determined that the operation corresponding to the migration request is delayed. This embodiment also has been described with reference to FIGS. 9 and 10.

When it is determined that the operation related to the migration request is delayed, the process may move to step S1205, and when it is determined that the operation related to the migration request is not delayed, the process may move to step S1211.

In step S1211, the storage device 50 may migrate residual data stored in the buffer memory block 110 to the first memory block 121, the residual data being data except for the data migrated to the first memory block 121 in step S1201 among the data stored in the buffer memory block 110.

In step S1205, the storage device 50 may migrate the residual data to the second memory block 122. In another embodiment, the storage device 50 may migrate the residual data to the third memory block 123. A memory cell included in the third memory block 123 may store data of a greater number of bits than data stored in a memory cell included in the second memory block 122.

After step S1205 or step S1211 is performed, in step S1207, the storage device 50 may notify the host 300 that the migration operation is completed.

In step S1209, the storage device 50 may reset the buffer memory block 110. Specifically, the storage device 50 may erase the data stored in the buffer memory block 110 or invalidate the data stored in the buffer memory block 110.

Figure 13:
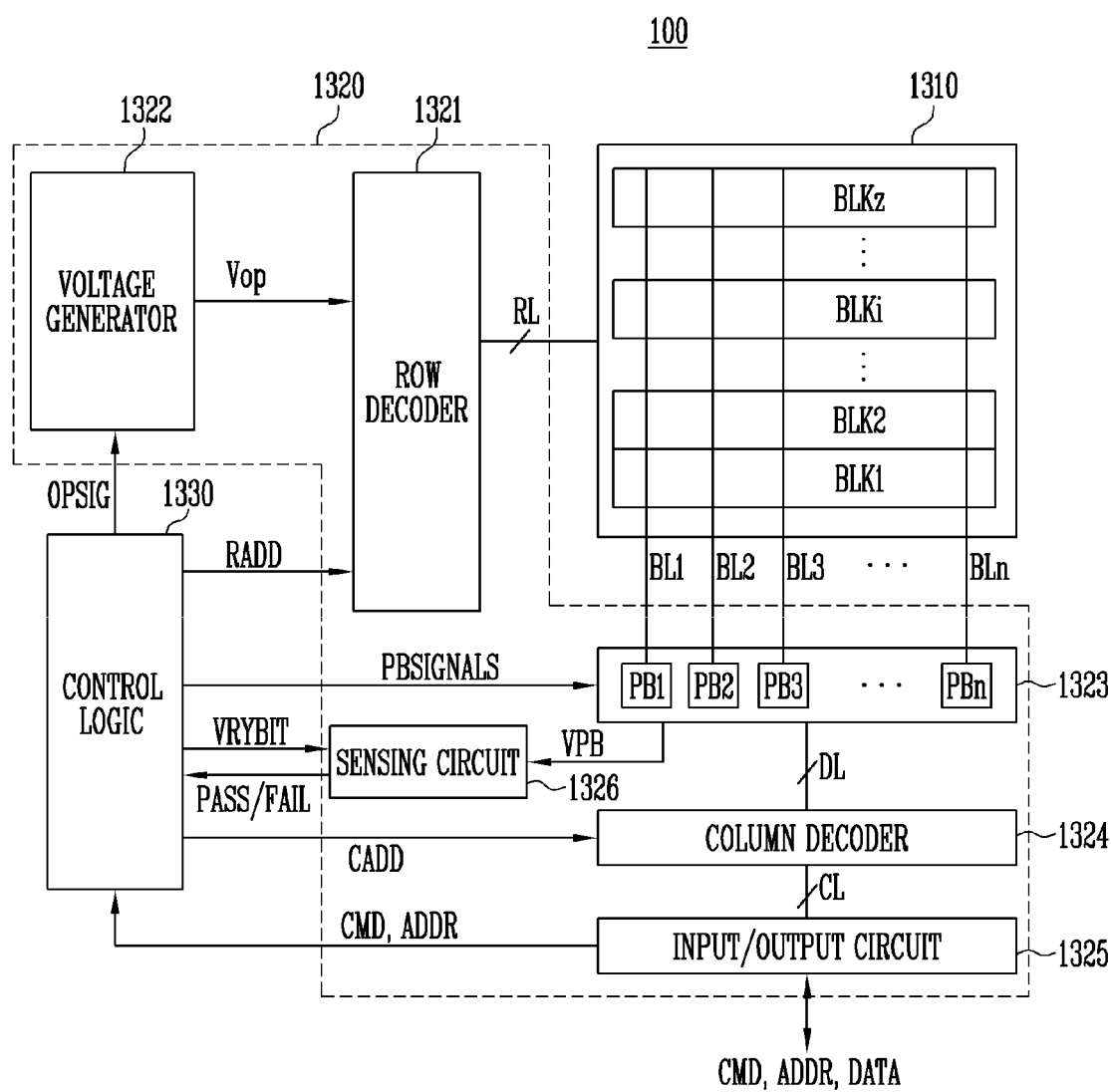
FIG. 13 is a diagram illustrating a memory device.

FIG. 13 is a diagram for describing the memory device 100 of FIG. 1 according to an embodiment of the present disclosure.

Referring to FIG. 13, the memory device 100 may include a memory cell array 1310, a peripheral circuit 1320, and a control logic 1330.

The memory cell array 1310 includes a plurality of memory blocks BLK1 to BLKz. The plurality of memory blocks BLK1 to BLKz are connected to a row decoder 1321 through row lines RL. The memory blocks BLK1 to BLKz may be connected to a page buffer group 1323 through bit lines BL1 to BLn. Each of the plurality of memory blocks BLK1 to BLKz includes a plurality of memory cells. In an embodiment, the plurality of memory cells are non-volatile memory cells. Memory cells connected to the same word line may be defined as one page. Thus, one memory block may include a plurality of pages.

The row lines RL may include at least one source select line, a plurality of word lines, and at least one drain select line.

Each of the memory cells included in the memory cell array 1310 may be an SLC storing one-bit data, an MLC storing two-bit data, a TLC storing three-bit data, or a QLC storing four-bit data.

The peripheral circuit 1320 may be configured to perform a program operation, a read operation, or an erase operation on a selected area of the memory cell array 1310 under the control of the control logic 1330. The peripheral circuit 1320 may drive the memory cell array 1310. For example, the peripheral circuit 1320 may apply various operation voltages to the memory cell array 1310 through the row lines RL and the bit lines BL1 to BLn or discharge the applied voltages under the control of the control logic 1330.

The peripheral circuit 1320 may include the row decoder 1321, a voltage generator 1322, the page buffer group 1323, a column decoder 1324, and an input/output circuit 1325.

The row decoder 1321 is connected to the memory cell array 1310 through the row lines RL. In an embodiment, the word lines included in the row lines RL may include normal word lines and dummy word lines. In an embodiment, the row lines RL may further include a pipe select line.

The row decoder 1321 is configured to operate in response to the control of the control logic 1330. The row decoder 1321 receives a row address RADD from the control logic 1330.

The row decoder 1321 is configured to decode the row address RADD. The row decoder 1321 selects at least one memory block among the memory blocks BLK1 to BLKz according to a decoded address. In addition, the row decoder 1321 may select at least one word line of the selected memory block to apply voltages generated by the voltage generator 1322 to the selected word line WL according to the decoded address.

For example, during the program operation, the row decoder 1321 may apply a program voltage to the selected word line and apply a program pass voltage, which has a level lower than that of the program voltage, to unselected word lines. During a program verify operation, the row decoder 1321 may apply a verify voltage to the selected word line and apply a verify pass voltage, which has a higher level than the verify voltage, to the unselected word lines. During the read operation, the row decoder 1321 may apply a read voltage to the selected word line and apply a read pass voltage, which has a higher level than the read voltage, to the unselected word lines.

In an embodiment, the erase operation of the memory device 100 is performed in a memory block unit. During the erase operation, the row decoder 1321 may select one memory block according to the decoded address. During the erase operation, the row decoder 1321 may apply a ground voltage to word lines connected to the selected memory block.

The voltage generator 1322 operates in response to the control of the control logic 1330. The voltage generator 1322 generates a plurality of voltages using an external power voltage supplied to the memory device 100. Specifically, the voltage generator 1322 may generate various operation voltages Vop used in the program, read, and erase operations in response to an operation signal OPSIG. For example, the voltage generator 1322 may generate the program voltage, the verify voltage, the pass voltage, the read voltage, the erase voltage, and the like in response to the control of the control logic 1330.

In an embodiment, the voltage generator 1322 may generate an internal power voltage by regulating the external power voltage. The internal power voltage generated by the voltage generator 1322 is used as an operation voltage of the memory device 100.

In an embodiment, the voltage generator 1322 may generate a plurality of voltages using the external power voltage or the internal power voltage.

For example, the voltage generator 1322 may include a plurality of pumping capacitors that receive the internal power voltage, and selectively activate the plurality of pumping capacitors in response to the control of the control logic 1330 to generate the plurality of voltages.

The generated plurality of voltages may be supplied to the memory cell array 1310 by the row decoder 1321.

The page buffer group 1323 includes first to n-th page buffers PB1 to PBn. The first to n-th page buffers PB1 to PBn are connected to the memory cell array 1310 through the first to n-th bit lines BL1 to BLn, respectively. The first to n-th page buffers PB1 to PBn operate under the control of the control logic 1330. Specifically, the first to n-th page buffers PB1 to PBn may operate in response to page buffer control signals PBSIGNALS. For example, the first to n-th page buffers PB1 to PBn may temporarily store data received through the first to n-th bit lines BL1 to BLn from the memory cell array 1310, or may sense a voltage or a current of the bit lines BL1 to BLn during the read or verify operation.

Specifically, during the program operation, when a program pulse is applied to the selected word line, the first to n-th page buffers PB1 to PBn may transfer data DATA, which is received through the data input/output circuit 1325, to selected memory cells through the first to n-th bit lines BL1 to BLn. Memory cells of the selected page are programmed according to the transferred data DATA. A memory cell connected to a bit line to which a program permission voltage (for example, the ground voltage) is applied may have an increased threshold voltage. A threshold voltage of a memory cell connected to a bit line to which a program inhibit voltage (for example, the power voltage) is applied may be maintained. During the program verify operation, the first to n-th page buffers PB1 to PBn read data from the selected page through the first to n-th bit lines BL1 to BLn.

During the read operation, the first to n-th page buffers PB1 to PBn read the data DATA from the memory cells of the selected page through the first to n-th bit lines BL1 to BLn, and outputs the read data DATA to the data input/output circuit 1325 under the control of the column decoder 1324.

During the erase operation, the first to n-th page buffers PB1 to PBn may float the first to n-th bit lines BL1 to BLn.

The column decoder 1324 may transfer data between the input/output circuit 1325 and the page buffer group 1323 in response to a column address CADD from the control logic 1330. For example, the column decoder 1324 may exchange data with the first to n-th page buffers PB1 to PBn through data lines DL or may exchange data with the input/output circuit 1325 through column lines CL.

The input/output circuit 1325 may transfer a command CMD and an address ADDR received from the memory controller 200 described with reference to FIG. 1 to the control logic 1330, or may exchange data DATA with the column decoder 1324.

The sensing circuit 1326 may generate a reference current in response to a permission bit signal VRYBIT during the read operation or the verify operation, and may compare a sensing voltage VPB received from the page buffer group 1323 with a reference voltage generated using the reference current to output a pass signal PASS or a fail signal FAIL.

The control logic 1330 may output the operation signal OPSIG, the row address RADD, the page buffer control signals PBSIGNALS, and the permission bit VRYBIT based on the command CMD and the address ADDR to control the peripheral circuit 1320. In addition, the control logic 1330 may determine whether the verify operation is passed or failed in response to the pass or fail signal PASS or FAIL.

Figure 14:
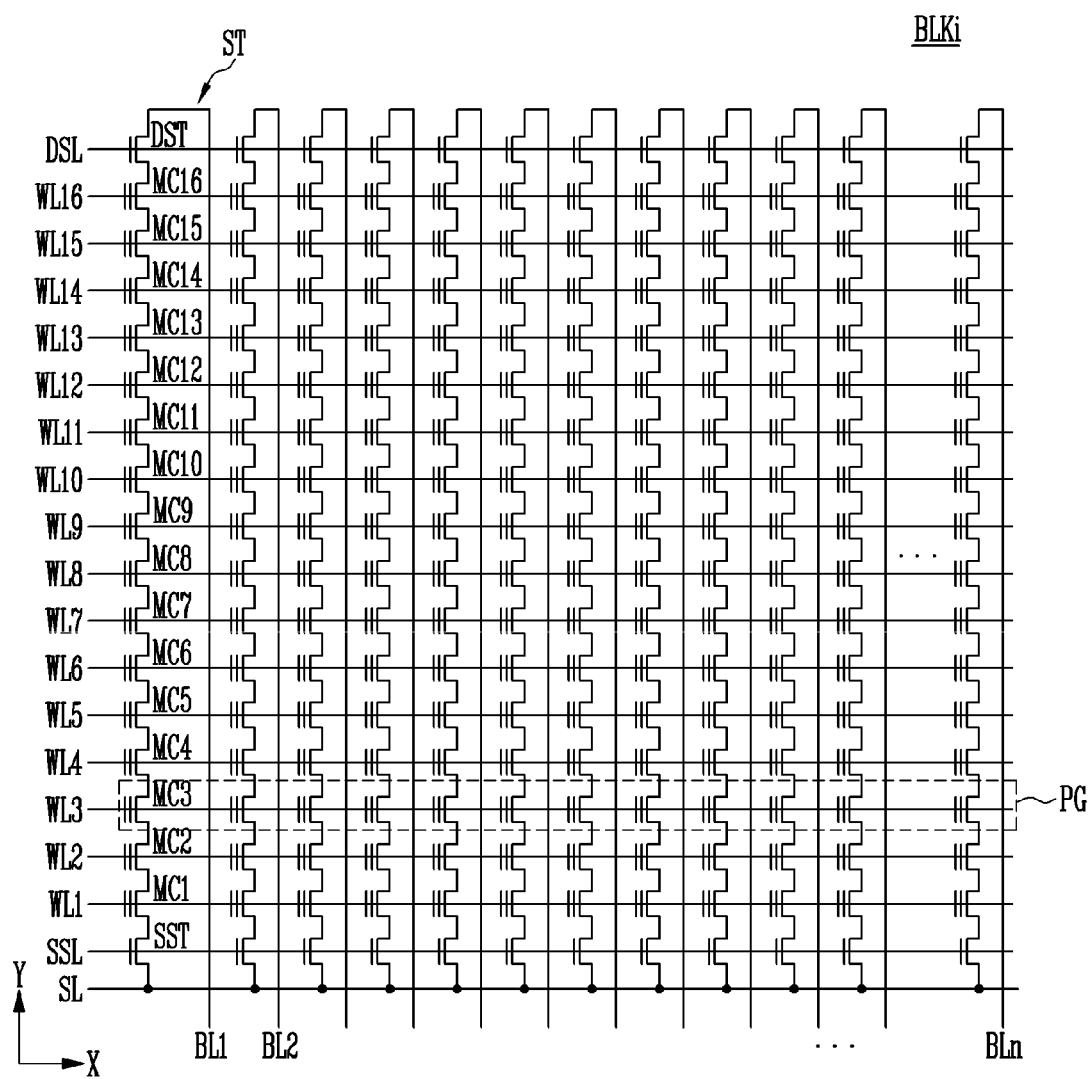
FIG. 14 is a diagram illustrating a memory block of FIG. 13.

FIG. 14 is a diagram for describing a memory block BLKi of FIG. 13.

Referring to FIG. 14, a plurality of word lines arranged in parallel to each other between a first select line and a second select line may be connected to the memory block BLKi. Here, the first select line may be a source select line SSL, and the second select line may be a drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured identically to each other, the string ST connected to the first bit line BL1 will be specifically described as an example.

The string ST connected to the first bit line BL1 may include a source select transistor SST, a plurality of memory cells MC1 to MC16, and a drain select transistor DST that are connected in series between the source line SL and the first bit line BL1. One string ST may include at least one source select transistor SST and at least one drain select transistor DST, and may include a greater number of memory cells than the memory cells MC1 to MC16.

A source of the source select transistor SST may be connected to the source line SL, and a drain of the drain select transistor DST may be connected to the first bit line BL1. The memory cells MC1 to MC16 may be connected in series between the source select transistor SST and the drain select transistor DST. Gates of the source select transistors SST included in different strings ST may be connected to the source select line SSL, gates of the drain select transistors DST may be connected to the drain select line DSL, and gates of the memory cells MC1 to MC16 may be connected to a plurality of word lines WL1 to WL16, respectively. A group of memory cells connected to the same word line among memory cells included in different strings ST may be referred to as a physical page PG. Therefore, the memory block BLKi may include as many physical pages PG as the number of word lines WL1 to WL16.

One memory cell may store 1-bit data. This is commonly called a single level cell (SLC). In this case, one physical page PG may correspond to one logical page (LPG) storing one logical page (LPG) data. The one logical page (LPG) data may include as many data bits as the number of cells included in one physical page (PG).

In addition, one memory cell may store multi-bit data. In this case, one physical page (PG) may correspond to multiple logical pages.

Figure 15:
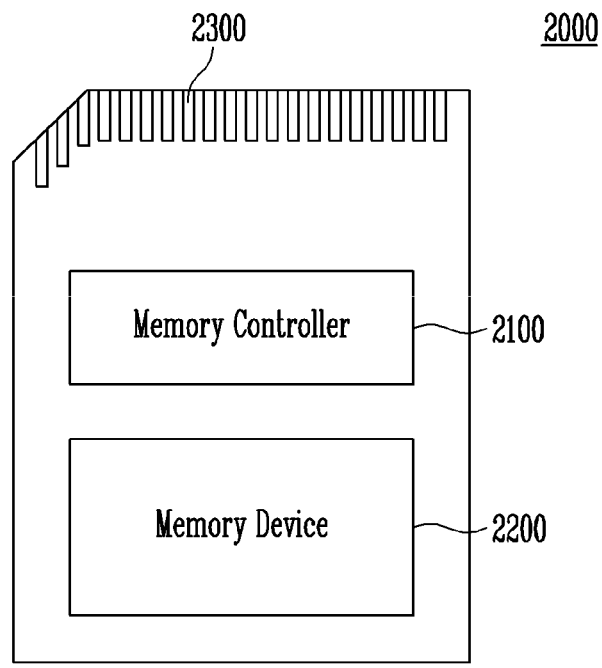
FIG. 15 is a block diagram illustrating a memory card system to which the storage device according to an embodiment of the present disclosure is applied.

FIG. 15 is a block diagram illustrating a memory card system 2000 to which the storage device according to an embodiment of the present disclosure is applied.

Referring to FIG. 15, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware for controlling the memory device 2200.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

The memory controller 2100 may perform the functions of the memory controller 200 described with reference to FIG. 1.

The memory device 2200 may be implemented as various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), a spin-torque magnetic RAM (STT-MRAM), and the like.

The memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMC-micro, or eMMC), an SD card (SD, miniSD, microSD, or SDHC), and a universal flash storage (UFS).

Figure 16:
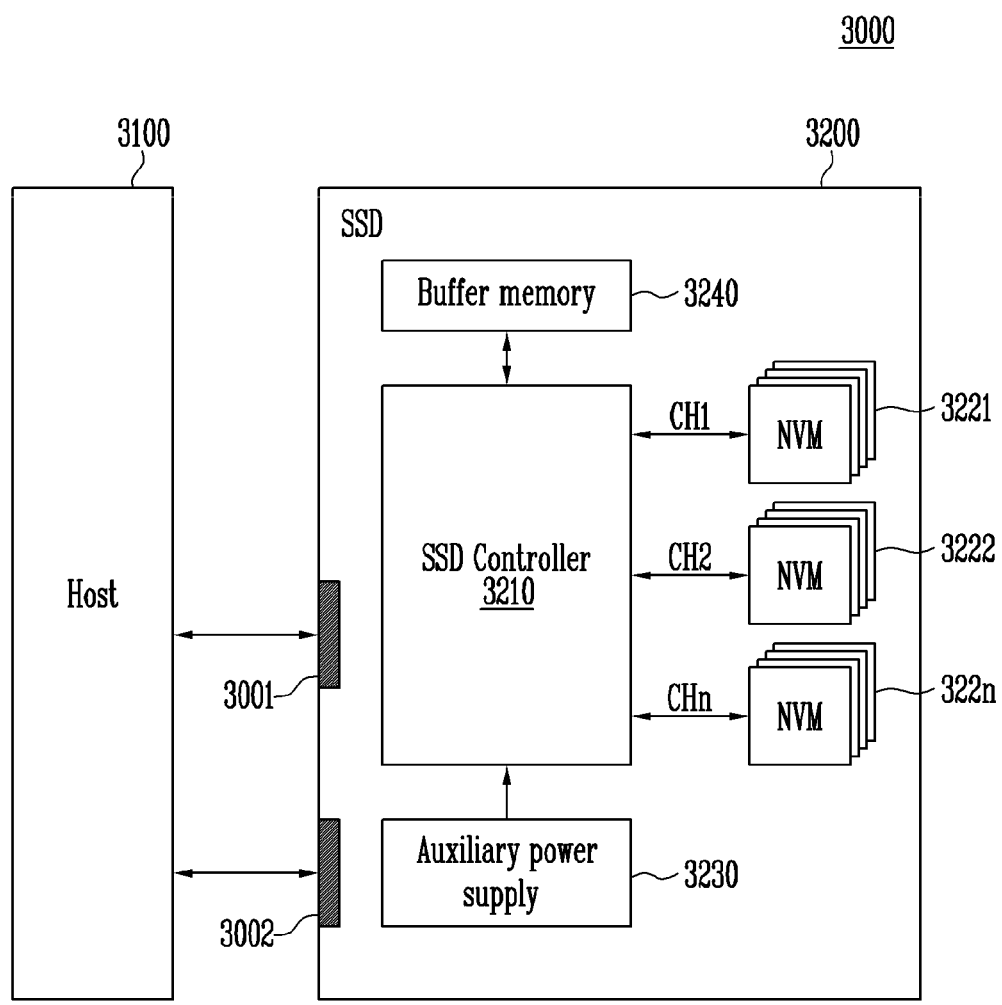
FIG. 16 is a block diagram illustrating a solid state drive (SSD) system to which the storage device according to an embodiment of the present disclosure is applied.

FIG. 16 is a block diagram illustrating a solid state drive (SSD) system 3000 to which the storage device according to an embodiment of the present disclosure is applied.

Referring to FIG. 16, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of non-volatile memories (NVMs) 3221 to 322n, an auxiliary power device 3230, and a buffer memory 3240.

The SSD controller 3210 may perform the functions of the memory controller 200 described with reference to FIG. 1.

The SSD controller 3210 may control the plurality of non-volatile memories 3221 to 322n in response to the signal SIG received from the host 3100. For example, the signal SIG may be signals transmitted based on an interface between the host 3100 and the SSD 3200. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100. The auxiliary power device 3230 may provide power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of non-volatile memories 3221 to 322n, or may temporarily store metadata (for example, a mapping table) of the non-volatile memories 3221 to 322n. The buffer memory 3240 may include a volatile memory such as a DRAM, an SDRAM, a DDR SDRAM, an LPDDR SDRAM, a GRAM, or the like, or a non-volatile memory such as an FRAM, a ReRAM, an STT-MRAM, a PRAM, or the like.

Figure 17:
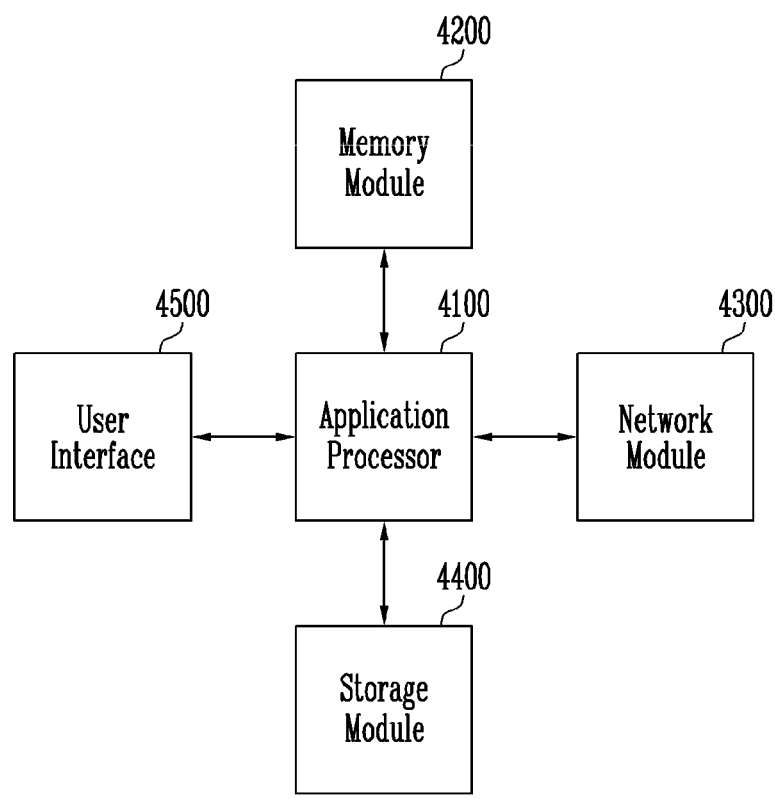
FIG. 17 is a block diagram illustrating a user system to which the storage device according to an embodiment of the present disclosure is applied.

FIG. 17 is a block diagram illustrating a user system 4000 to which the storage device according to an embodiment of the present disclosure is applied.

Referring to FIG. 17, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile memory such as a DRAM, an SDRAM, a DDR SDRAM, a DDR2 SDRAM, a DDR3 SDRAM, an LPDDR SDARM, an LPDDR2 SDRAM, or an LPDDR3 SDRAM, or a non-volatile memory, such as a PRAM, a ReRAM, an MRAM, or an FRAM. For example, the application processor 4100 and the memory module 4200 may be packaged based on a package on package (POP) and provided in one semiconductor package.

The network module 4300 may communicate with external devices. For example, the network module 4300 may support wireless communications such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. In an embodiment, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a non-volatile memory such as a phase-change RAM (PRAM), a magnetic RAM (MRAM), a resistive RAM (RRAM), a NAND flash, a NOR flash, a three-dimensional NAND flash, or the like. For example, the storage module 4400 may be provided as a removable storage device (removable drive), such as a memory card, or an external drive of the user system 4000.

For example, the storage module 4400 may include a plurality of non-volatile memory devices, and the plurality of non-volatile memory devices may operate identically to the memory device described with reference to FIGS. 13 and 14. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include one or more of user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include one or more of user output interfaces such as a liquid crystal display (LCD), an organic light emitting diode (OLED) display device, an active matrix OLED (AMOLED) display device, an LED, a speaker, and a monitor.

As described above, according to embodiments of the present disclosure, while migrating data stored in the buffer memory block 110 to the first memory block 121, data that is not yet migrated to the first memory block 121 may be migrated to the second memory block 122 that can store reliable data quickly compared to the first memory block 121, and thus the speed of migration may be improved.

While various embodiments have been described above, it will be understood to those skilled in the art that the embodiments described are by way of example only. Accordingly, the system and device described herein should not be limited based on the described embodiments.

What is claimed is:

1. A storage device, comprising:
a memory device including a device memory block, and a buffer memory block temporarily storing data, the device memory block including a first memory block and a second memory block;
and a memory controller configured to control, in response to a migration request received from a host, the memory device to migrate the data, which is stored in the buffer memory block, to the first memory block and the second memory block,
wherein while migrating the data to the device memory block, the memory controller changes a target memory block, in which the data is to be stored, from the first memory block to the second memory block according to whether an operation corresponding to the migration request is delayed or not,
and wherein a first memory cell, included in the first memory block, stores a greater number of bits than a second memory cell included in the second memory block.

2. The storage device of claim 1, wherein the memory controller controls the memory device to change the target memory block from the first memory block to the second memory block according to whether a delay time, of the operation corresponding to the migration request, exceeds a first threshold time, and
wherein the delay time corresponds to a period of time from when a command for processing the operation is generated to when the processing of the operation starts.

3. The storage device of claim 1,
wherein the memory controller controls the memory device to change the target memory block from the first memory block to the second memory block according to whether a number of subsequent commands exceeds a threshold number,
and wherein the subsequent commands correspond to subsequent requests received after the migration request, and the subsequent commands have higher processing priority than the operation corresponding to the migration request.

4. The storage device of claim 1, wherein the memory controller controls the memory device to change the target memory block from the first memory block to the second memory block according to whether a delay time, of an operation corresponding to a subsequent request received after the migration request, exceeds a second threshold time, and
wherein the operation corresponding to the migration request has higher processing priority than the operation corresponding to the subsequent request.

5. The storage device of claim 1, wherein, after changing the target memory block from the first memory block to the second memory block, the memory controller controls the memory device to migrate residual data to the second memory block,
and wherein the residual data is the data, in the buffer memory block, that excludes the data migrated to the first memory block before changing the target memory block.

6. The storage device of claim 5, wherein the memory controller notifies the host of completion of migration after the residual data is migrated to the second memory block.

7. A memory controller for controlling a memory device including a buffer memory block and a device memory block, the device memory block including a first memory block and a second memory block, the memory controller comprising:
a migration controller configured to control, in response to a migration request from a host, the memory device to migrate data, which is stored in the buffer memory block, to the device memory block,
wherein the memory controller is configured to, while migrating the data to the device memory block, determine a target memory block, in which the data is to be stored, between the first memory block and the second memory block according to whether an operation corresponding to the migration request is delayed or not,
wherein a first memory cell, included in the first memory block, stores a greater number of bits than a second memory cell included in the second memory block.

8. The memory controller of claim 7, wherein the memory controller determines the target memory block according to whether a delay time of the operation corresponding to the migration request exceeds a first threshold time, the delay time corresponding to a period of time from when a command for processing the operation is generated to when the processing of the operation starts.

9. The memory controller of claim 7, wherein the memory controller determines the target memory block according to whether a number of subsequent commands exceeds a threshold number,
and wherein the subsequent commands correspond to subsequent requests received after the migration request and the subsequent commands have higher processing priority than the operation corresponding to the migration request.

10. The memory controller of claim 9, further comprising:
a command queue i) storing commands generated in response to the migration request and the subsequent commands generated in response to the subsequent requests, and ii) transferring the stored commands to the memory device.

11. The memory controller of claim 7, wherein the memory controller determines the target memory block according to whether a delay time, of an operation corresponding to a subsequent request received after the migration request, exceeds a second threshold time, and
wherein the operation corresponding to the migration request has higher processing priority than the operation corresponding to the subsequent request.

12. The memory controller of claim 7, wherein when the memory controller changes the target memory block from the first memory block to the second memory block according to whether the operation corresponding to the migration request is delayed or not, the migration controller controls the memory device to migrate residual data to the second memory block, and
wherein the residual data is the data, in the buffer memory block, that excludes the data migrated to the first memory block before changing the target memory block.

13. A method of operating a storage device comprising a memory device and a memory controller, the method comprising:
storing data in a buffer memory block of the memory device in response to a turbo write request;
and migrating the data, which is stored in the buffer memory block of the memory device, to a target memory block in the memory device in response to a migration request received from a host,
wherein the migrating comprises:
while migrating the data to a device memory block, changing the target memory block, in which the data is to be stored, from a first memory block to a second memory block according to whether an operation corresponding to the migration request is delayed or not, the first and second memory block being included in the device memory block of the memory device;
and migrating a portion of the data to the second memory block when the operation corresponding to the migration request is delayed,
and wherein a first memory cell, included in the first memory block, stores a greater number of bits than a second memory cell included in the second memory block.

14. The method of claim 13, wherein changing the target memory block comprises:
changing the target memory block from the first memory block to the second memory block according to whether a delay time, of the operation corresponding to the migration request, exceeds a first threshold time, the delay time corresponding to a period of time from when a command for processing the operation is generated to when the processing of the operation starts.

15. The method of claim 13, wherein changing the target memory block comprises:
changing the target memory block from the first memory block to the second memory block according to whether a number of subsequent commands exceeds a threshold number,
and wherein the subsequent commands correspond to subsequent requests received after the migration request and the subsequent commands have higher processing priority than the operation corresponding to the migration request.

16. The method of claim 13, wherein migrating the portion of the data to the second memory block comprises:
migrating residual data to the second memory block,
and wherein the residual data is the data, in the buffer memory block, that excludes the data migrated to the first memory block before changing the target memory block.

17. The method of claim 16, further comprising:
notifying the host of completion of migration after migrating the residual data to the second memory block.

* * * * *